United States Patent
Kojima et al.

(10) Patent No.: US 7,665,791 B2
(45) Date of Patent: Feb. 23, 2010

(54) SEAT SLIDE DEVICE FOR VEHICLE

(75) Inventors: Yasuhiro Kojima, Kariya (JP);
Masatoshi Hayakawa, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/294,061

(22) PCT Filed: Mar. 30, 2007

(86) PCT No.: PCT/JP2007/000343

§ 371 (c)(1),
(2), (4) Date: Sep. 23, 2008

(87) PCT Pub. No.: WO2007/129435

PCT Pub. Date: Nov. 15, 2007

(65) Prior Publication Data

US 2009/0102263 A1   Apr. 23, 2009

(30) Foreign Application Priority Data

Apr. 14, 2006  (JP)  .............................. 2006-112248

(51) Int. Cl.
*B60N 2/02* (2006.01)
(52) U.S. Cl. .................. 296/65.13; 248/430; 296/65.14
(58) Field of Classification Search .................. 248/430, 248/429, 424, 298.1; 297/344.11; 296/65.13, 296/65.14, 65.15
See application file for complete search history.

(56) References Cited

U.S. PATENT DOCUMENTS

| 5,842,383 | A | * | 12/1998 | Yamada et al. ................. 74/528 |
| 6,086,154 | A | * | 7/2000 | Mathey et al. ............... 297/341 |
| 6,354,553 | B1 | * | 3/2002 | Lagerweij et al. ........... 248/430 |
| 6,688,574 | B2 | | 2/2004 | Obazaki et al. |
| 7,147,195 | B2 | * | 12/2006 | Danjo et al. ................. 248/430 |
| 7,503,614 | B2 | * | 3/2009 | Yamada et al. ........... 296/65.13 |
| 7,506,856 | B2 | * | 3/2009 | Ikegaya et al. .............. 248/430 |
| 2006/0131470 | A1 | * | 6/2006 | Yamada et al. .............. 248/424 |
| 2008/0048087 | A1 | * | 2/2008 | Kojima et al. ............... 248/430 |
| 2009/0058169 | A1 | * | 3/2009 | Soga ........................ 297/463.1 |

FOREIGN PATENT DOCUMENTS

| JP | 2000 38064 | 2/2000 |
| JP | 2002 154356 | 5/2002 |
| JP | 2005 7982 | 1/2005 |

\* cited by examiner

*Primary Examiner*—Ramon O Ramirez
(74) *Attorney, Agent, or Firm*—Oblon, Spivak, McClelland, Maier & Neustadt, L.L.P.

(57) ABSTRACT

In a seat sliding device having a lock mechanism disposed within an inner space defined by an upper rail and a lower rail, to tilt a lock lever from the inner space toward the outside of the rails, a torsion bar 40 is used as urging means for urging the lock lever 31 in the lock mechanism 30. When an operation lever 50 is in its inoperative state, the lock lever is urged by torsional force of the torsion bar in its locking direction, claws 32 are fitted into engaging holes 11a and 21a, from the inside of the lower rail 10 and upper rail 20 toward the outside of the rails, to be placed in its locking position. When the operation lever is operated, the lock lever is tilted against the torsional force of the torsion bar, the fitted state with the claws being fitted into the engaging holes of both rails is released, to make the upper rail movable relative to the lower rail.

7 Claims, 8 Drawing Sheets

SEAT SLIDE DEVICE FOR VEHICLE

TECHNICAL FIELD

The present invention relates to a seat sliding device for a vehicle, and more particularly to a seat sliding device for a vehicle, which is provided with a lock mechanism disposed in an inner space defined by an upper rail and a lower rail, with a lock lever being tilted from the inner space toward the outside of the rails to lock the upper rail relative to the lower rail.

BACKGROUND ART

For example, in the following Patent document 1, it is an object to form the seat sliding device for the vehicle as described above in a compact size, and there is proposed a lock mechanism, which includes a lock lever disposed within sections of both rails, extended longitudinally, assembled in the upper rail to be capable of being tilted, and provided with claws to be capable of being fitted into engaging holes formed on both rails from the inside of both rails toward the outside thereof, a spring member disposed within the sections of both rails for urging the lock lever in its locking direction, and operation means assembled in the upper rail for operating to tilt the lock lever.

Furthermore, in the following Patent document 2, it is an object to position only a middle portion of a spring member relative to a latch lever, without restricting opposite ends of the spring member, and it is proposed to form the spring member like a dogleg-shaped bar, contact its opposite ends with a bent portion of the upper rail, contact the middle portion with a spring hanging portion, provide a pair of holding portions on one of the spring hanging portion and the middle portion of the spring member, and provide engaging portions positioned between the pair of holding portions on the other one of them.

Patent document 1:
Japanese Patent Laid-open Publication No. 2002-154356
Patent document 2:
Japanese Patent Laid-open Publication No. 2005-7982

DISCLOSURE OF THE INVENTION

Problems to be Solved by the Invention

However, although the spring member as described in the above-cited Patent document 2 is formed in a bar-like shape, it is the one for producing deflection by load, so that it is substantially the same as a plate shaped spring as described in the Patent document 1, and they are different merely in their supporting structures. In addition, according to the supporting structure as described in the Patent document 2, the supporting point of the latch lever is positioned on the middle point connecting a point where the bar-like spring urges the latch lever and a point where it contacts with a release lever, so that the lower load applied to the supporting point will be increased. Therefore, relatively large strength is required for parts or structure for supporting the latch lever, which will still cause the cost-up. Furthermore, if such a structure is employed that the position for supporting the latch lever (lock lever) and the positions of the lock claws are placed upside down, the protrusion or bracket for supporting the bar-like spring is required, like the plate shaped spring as described above, so that the cost-up shall be unavoidable too, in this case.

In the meantime, as for the spring member, there has been known heretofore a torsion bar-like spring (abbreviated as torsion bar). Although the torsion bar has a bar-like portion, which is different from the bar-like spring as described in the Patent document 2, it is the spring using elastic torsion deformation of spring steel, which is high in energy absorption ratio per unit weight, simple in structure, and which has an advantage in being able to be formed at low cost. However, according to its characteristic, it has to be long in size. Therefore, it can not be applied to the seat sliding devices as described in the above-cited Patent documents 1 and 2, and naturally, such application has not been proposed.

Therefore, according to the present invention, in a seat sliding device for a vehicle having a lock mechanism disposed within an inner space defined by an upper rail and a lower rail, to tilt a lock lever from the inner space toward the outside of the rails, it is an object to provide an inexpensive seat sliding device, with the lock mechanism or the like being easily assembled.

Means for Solving the Problems

To solve the above-described problems, a seat sliding device for a vehicle of the present invention is constituted to comprise a lower rail fixed to a floor of the vehicle, an upper rail supported on a seat of said vehicle, and mounted on said lower rail to be longitudinally movable relative thereto, and to define an inner space together with said lower rail, a lock lever disposed in said inner space defined by said upper rail and said lower rail, and tilted from said inner space toward the outside of said rails to lock said upper rail relative to said lower rail, a torsion bar having a bar-like portion extended longitudinally along said upper rail, a contact portion formed integrally therewith at one end thereof to contact said lock lever, a first mounting portion formed adjacent to said contact portion and supported on said upper rail to provide a rotation center of said contact portion, and a second mounting portion formed at the other end of said bar-like portion and fixed to said upper rail to provide a fixed portion of said torsion bar, and operation means for operating said lock lever in a releasing direction thereof.

Particularly, it is preferable that said upper rail has a pair of lateral side walls, and a first mounting hole defined in one of said side walls, and that said first mounting portion of said torsion bar has a bent portion being offset to an axis of said bar-like portion to be engaged with said first mounting hole, to support said first mounting portion on said upper rail. Or, it may be so constituted that said upper rail has a pair of lateral side walls, and a bracket fixed to said upper rail to define a clearance inside of one of said pair of side walls, and that said second mounting portion of said torsion bar is received in said clearance, to be supported by said upper rail.

Also, it may be so constituted that said upper rail has a pair of lateral side walls, and a pair of second mounting holes defined in said pair of side walls respectively, to be opposed to each other, and said second mounting portion has a larger width than an inner width of said pair of side walls of said upper rail, and that laterally opposite ends of said second mounting portion are engaged with said pair of second mounting holes, respectively. Furthermore, it may be so constituted that said upper rail has a pair of lateral side walls, an upper wall connecting said pair of side walls, and an opening defined at a corner portion between said upper wall and one of said pair of side walls, and that said operation means is disposed for tilting said lock lever in a releasing direction thereof through said opening. In this case, it may be so constituted that said contact portion is disposed relative to said operation means and said lock lever, such that a direction of torsional force caused by said torsion bar against said lock lever, and a lock-releasing direction of operational force applied by said operation means are opposed to each other on an approximately common axis.

And, said upper rail may have a pair of lateral side walls, an upper wall connecting said pair of side walls, and an opening defined at a corner portion between said upper wall and one of said side walls, and said lock lever may have an arm extended from said inner space to the outside of said rails through said opening to contact said contact portion. Furthermore, said upper rail may have a bracket fixed to said upper rail, and having a first flange wall with a first cutout defined therein and a second flange wall with a second cutout defined therein, and it may be so constituted that said first mounting portion of said torsion bar is engaged with said first cutout, and that said second mounting portion of said torsion bar is engaged with said second cutout.

EFFECTS OF THE INVENTION

As the present invention has been constituted as described above, the following effects are achieved. That is, according to the seat sliding device for the vehicle as described above, urging means for urging the lock lever is constituted by the torsion bar extended longitudinally along the upper rail, its first mounting portion is supported on the upper rail to provide the rotation center of the contact portion, and its second mounting portion is fixed to the upper rail to provide the fixed portion of the torsion bar. Therefore, by means of the torsional force of the torsion bar, the lock lever can be urged in the locking direction, certainly and appropriately, with a simple structure. In addition, as the urging direction of the torsion bar can be set to be the same as the tilting direction of the lock lever, a good feeling in operation can be ensured. Also, the lock mechanism is disposed in the inner space defined by the upper rail and the lower rail, and the lock lever can be tilted in the inner space, so that the dimension of the upper rail can be made small. As a result, the seat sliding device can be made small in size. Furthermore, with the supporting condition of the torsion bar being changed, the locking direction of the lock mechanism can be set to be opposite, designing feasibility can be increased, comparing with the prior devices.

Especially, as for the first mounting portion of the torsion bar, if it is so constituted to be provided with the bent portion which is offset to the axis of the bar-like portion, the upper rail may be formed with only a first mounting hole in a recessed shape, in order to support the torsion bar, without requiring a protrusion or the like to be formed on the upper rail, so that it can be easily formed, and formed at a low cost. Or, if it is so constituted that the bracket is fixed to the upper rail, a part of the bar-like portion of the torsion bar can be provided automatically as the first mounting portion of the torsion bar, while the bracket is required, and the designing feasibility can be increased, depending upon designing or assembling conditions.

Also, as for the second mounting portion of the torsion bar, if it is so constituted to be formed with a larger width than the inner width of the pair of side walls of the upper rail, the upper rail may be formed with only a pair of second mounting holes, without requiring a protrusion or the like to be formed on the upper rail, it can be easily formed, and formed at a low cost.

And, if it is so constituted that the operation means is arranged to move the lock lever to be tilted in its lock-releasing direction through the opening of the upper rail, the urging direction of the torsion bar will be the same as the tilting direction of the lock lever, variation of operational force of the lock lever tends to be linear, a good feeling in operation will be given to the operation lever. Especially, if it is so constituted that the contact portion is disposed such that the direction of torsional force caused by the torsion bar against the lock lever and the lock-releasing direction of the operational force applied by the operation means against the lock lever are opposed to each other on the approximately common axis, the load applied to the rotation axis of the lock lever in its radial direction, can be made small. As a result, simplifying the structure for supporting the lock lever can be achieved, and it can be constituted at a low cost.

And, if it is so constituted that the lock lever has the arm extended from the inner space toward the outside of the rails through the opening to contact the contact portion, the designing feasibility will be increased. Furthermore, if it is so constituted that the bracket having the first and second flange walls and the first and second cutouts is fixed to the upper rail, and that the first mounting portion of the torsion bar is engaged with the first cutout, and the second mounting portion is engaged with the second cutout, the designing feasibility will be increased more.

DESCRIPTION OF CHARACTERS

10: lower rail
11*a*: engaging hole
20: upper rail
21, 22: side wall
21*a*: engaging hole
21*b*: first mounting hole 21c, 22c: second mounting hole
22a: opening
30: lock mechanism
31, 61, 61x: lock lever
32, 62, 62x: claw
33, 63, 63x: arm
40, 40x: torsion bar
41, 41x: first mounting portion
42, 42x: second mounting portion
42a, 42b: engaging portion
43, 43x: contact portion
44, 44x: bar-like portion
50: operation lever
70: bracket

BEST MODE FOR CARRYING OUT THE INVENTION

Figure 1:
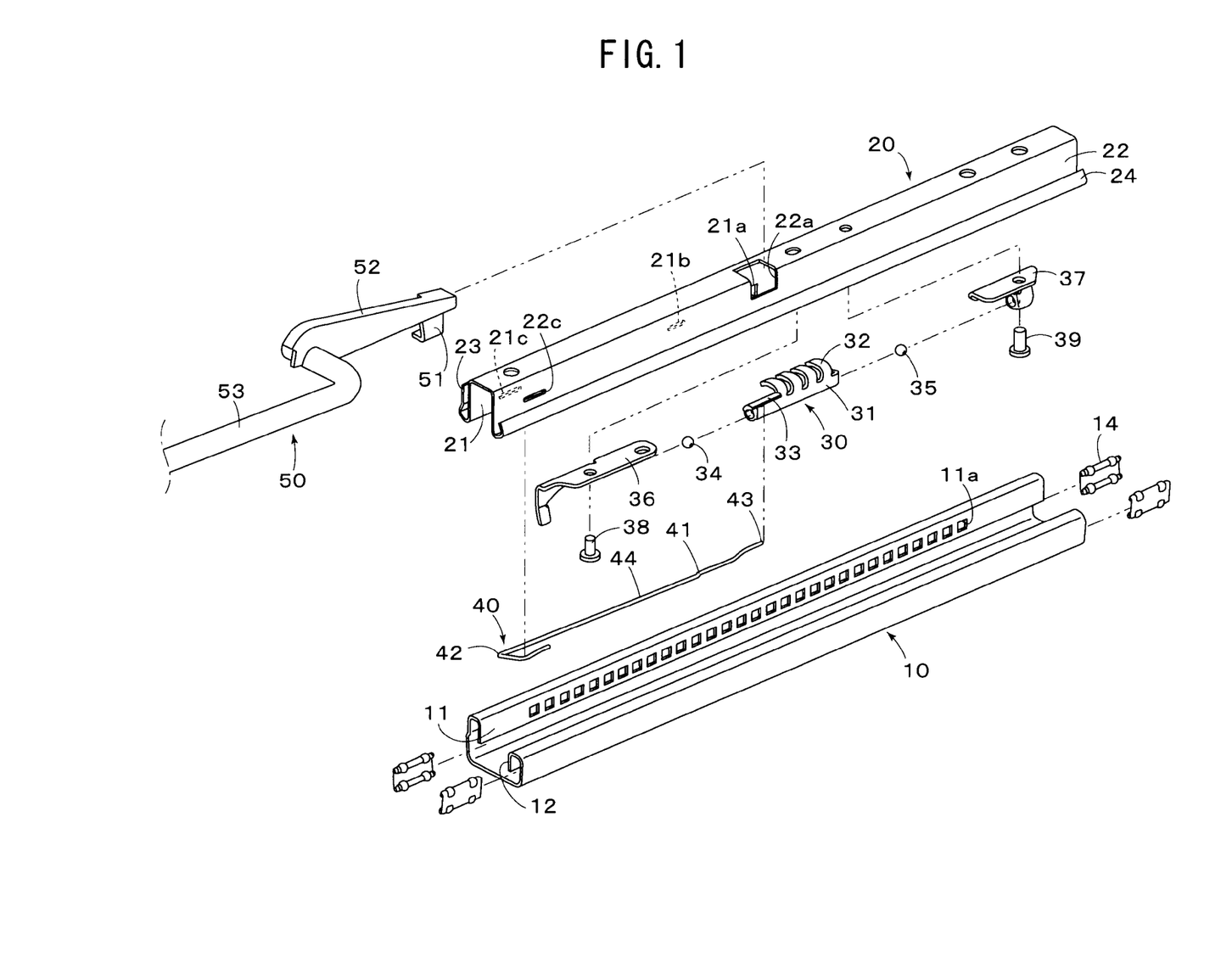
FIG. 1 is an unassembled perspective view of a main part of a seat sliding device for a vehicle according to an embodiment of the present invention.
Figure 2:
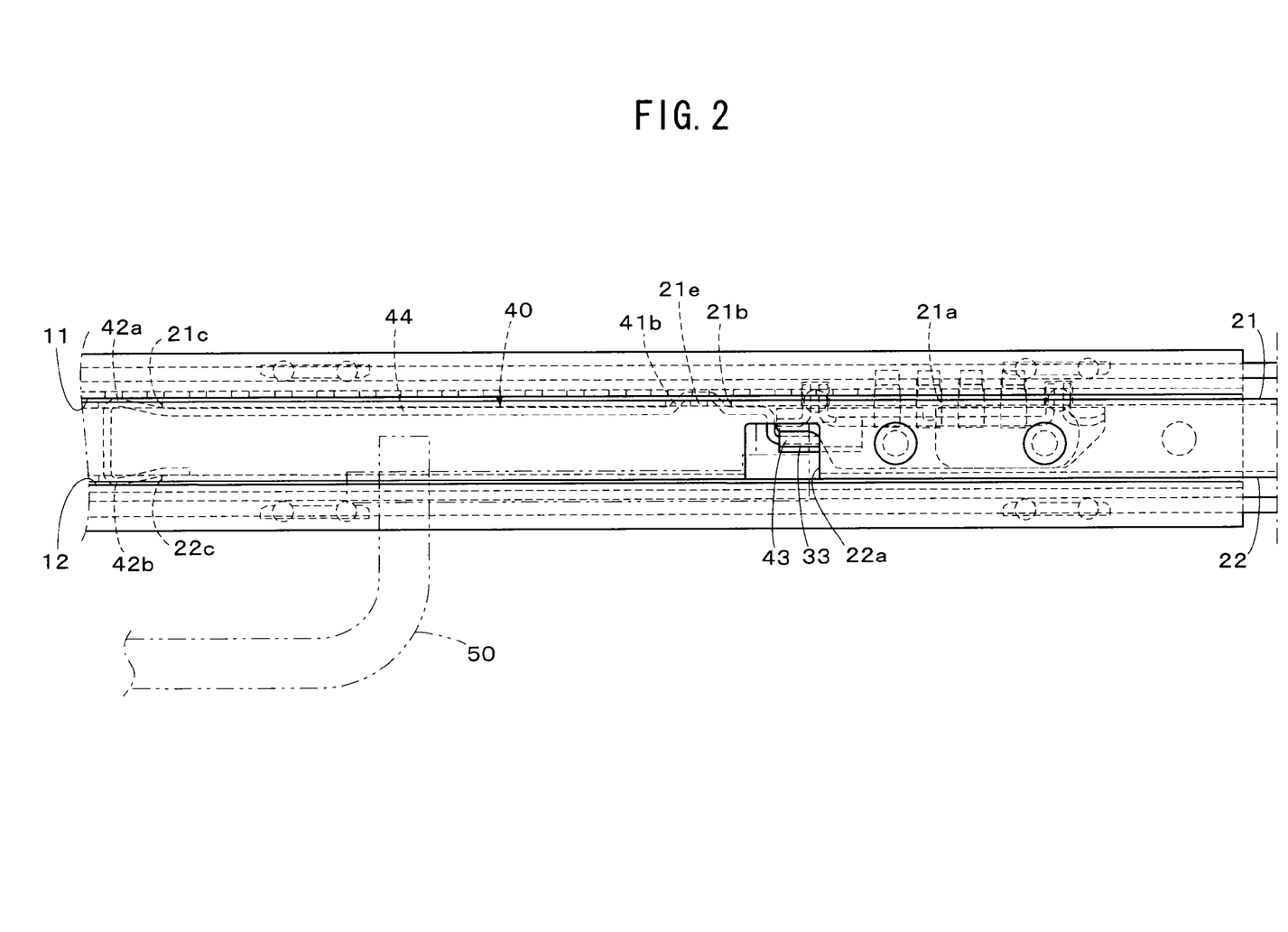
FIG. 2 is a plan view of a lock mechanism part of a seat sliding device for a vehicle according to an embodiment of the present invention.
Figure 3:
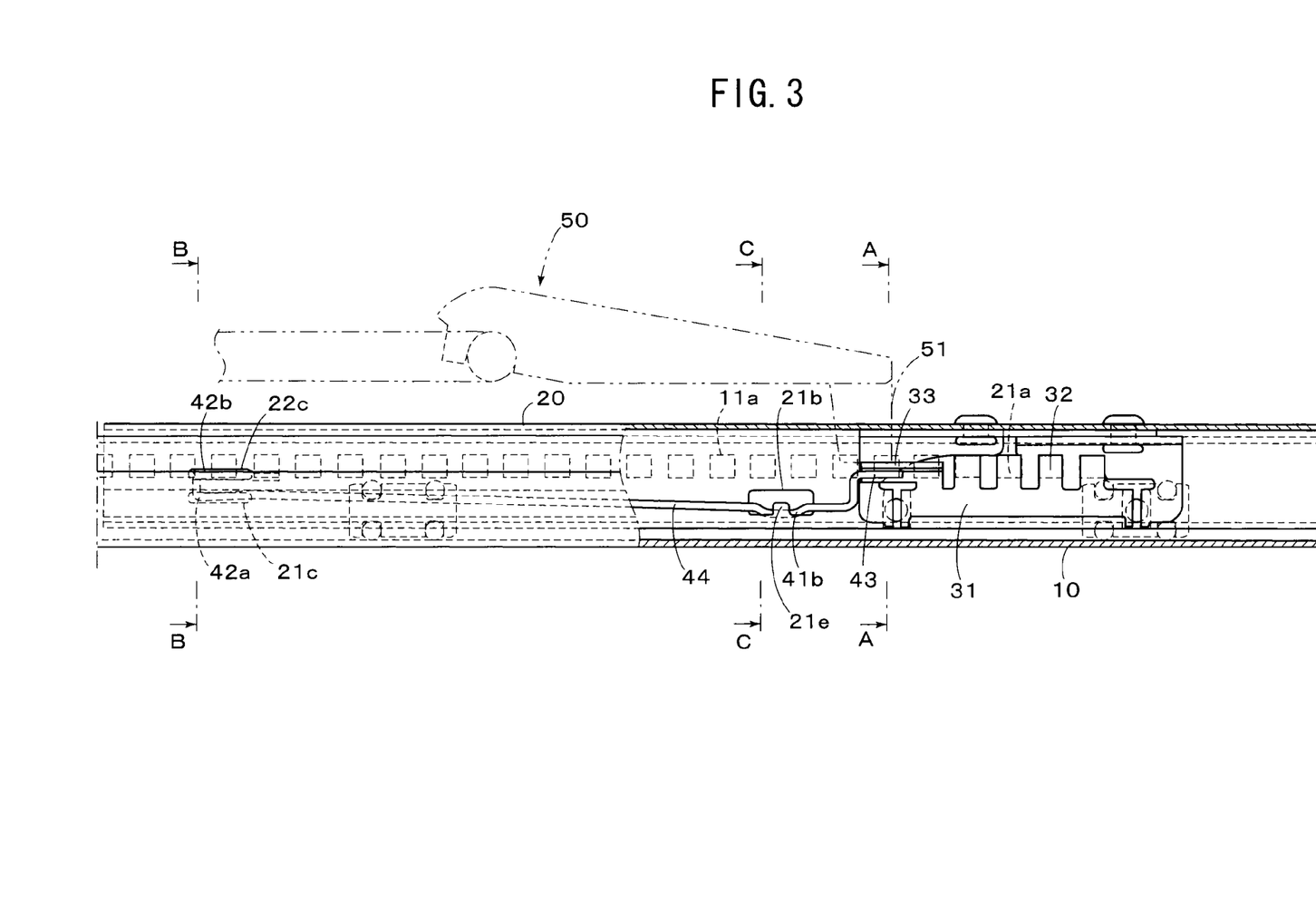
FIG. 3 is a partially sectioned side view of a lock mechanism part of a seat sliding device for a vehicle according to an embodiment of the present invention.
Figure 4:
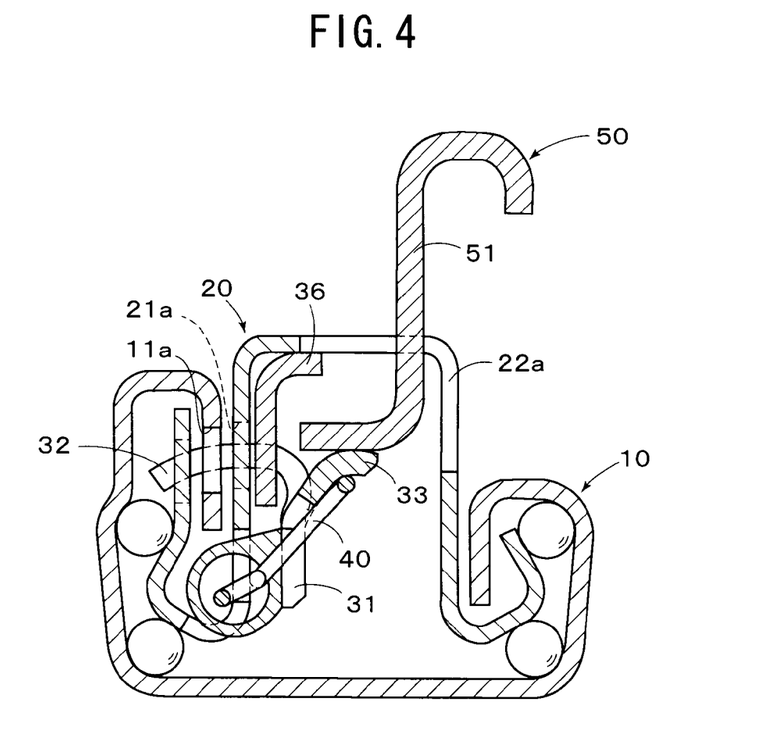
FIG. 4 is a sectional view sectioned along A-A line in FIG. 3.
Figure 5:
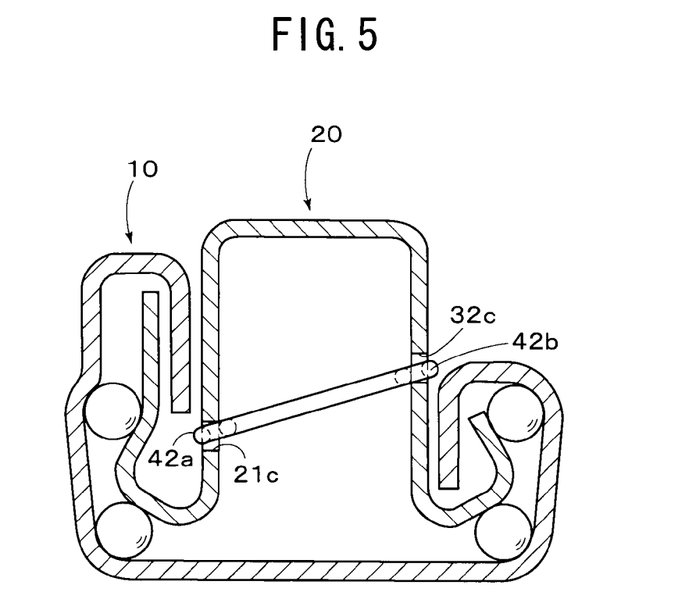
FIG. 5 is a sectional view sectioned along B-B line in FIG. 3.
Figure 6:
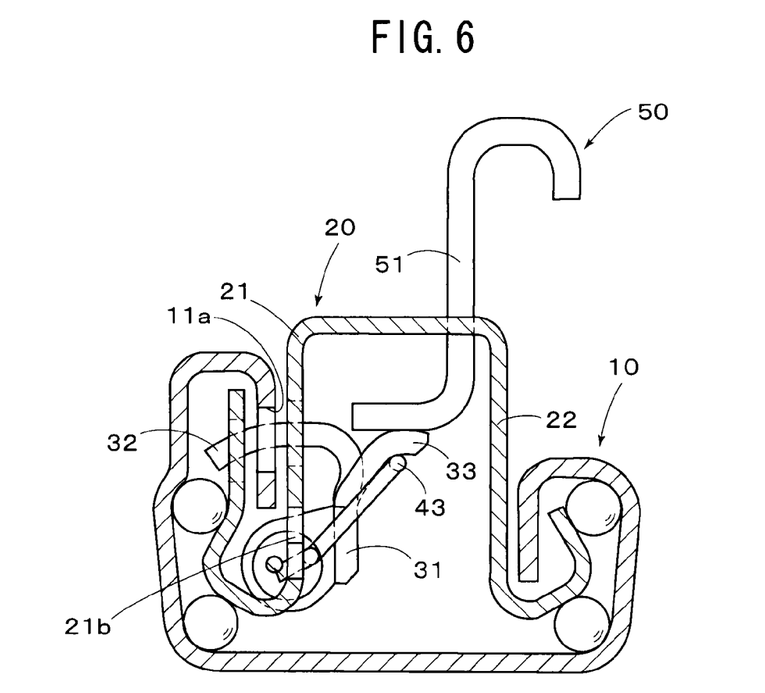
FIG. 6 is a sectional view sectioned along C-C line in FIG. 3.
Figure 7:
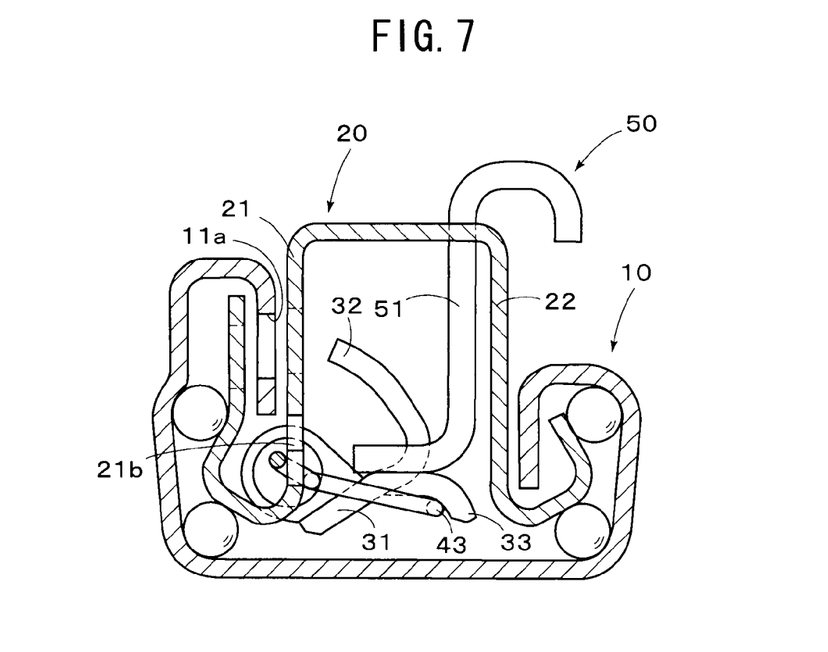
FIG. 7 is a sectional view sectioned along C-C line in FIG. 3, showing an operating state of a lock mechanism part according to an embodiment of the present invention.

Hereinafter, will be explained a desirable embodiment of the present invention. FIG. 1 is an unassembled view of a seat sliding device for a vehicle according to an embodiment of the present invention. FIG. 2 shows its plan view, FIG. 3 shows its side view, and FIGS. 4, 5 and 6 show sectional views along A-A line, B-B line, and C-C line in FIG. 3, respectively. Hereinafter, structure of each part will be explained, as well as its assembled state. At the outset, as a fundamental structure of the seat sliding device, there are provided a lower rail 10 which is fixed to a floor (not shown) of the vehicle, and an upper rail 20 which is fixed to a seat (not shown) of the vehicle, and which is mounted on the lower rail 10 to be longitudinally movable relative thereto, and to define an inner space together with the lower rail 10. And, a lock mechanism 30 is disposed in the inner space defined by the lower rail 10 and the upper rail 20. Although a pair of lower rail 10 and upper rail 20 is arranged at left and right sides of the vehicle, respectively, only the pair at one side is shown in FIG. 1.

The lower rail 10 of the present embodiment is formed such that its longitudinal opening portion is folded inside thereof as shown in FIG. 1, so that the folded portions 11 and 12 are formed to be opposed to each other as shown in FIG. 1. And, a plurality of rectangular engaging holes (represented by 11a) are formed on the folded portion 11 of the lower rail 10 in its longitudinal direction. On the other hand, the upper rail 20 has a pair of lateral side walls 21 and 22, and an upper wall connecting them, and its longitudinal opening portion is folded outside thereof to form the folded portions 23 and 24. On the one side wall 21 of the upper rail 20, a rectangular engaging hole 21a is formed, and a first mounting hole 21b of a recessed shape is formed, so that a protrusion portion 21e is formed at its lower side. Also, on both lateral sides 21 and 22, a pair of second mounting holes 21c and 22c shaped in rectangular holes are defined to be opposed to each other, at the positions remote from the first mounting hole 21b by a predetermined distance in the longitudinal direction. Furthermore, at a corner of the upper rail 20, there is formed an opening 22a, through which an operation lever 50 served as the operation means is arranged to operate the lock mechanism 30 in a releasing direction thereof.

Consequently, when the lower rail 10 and the upper rail 20 are assembled together such that their longitudinal opening portions are opposed to each other, the inner space is defined between them. Furthermore, four ball units 14 are disposed between the inside wall surfaces of both lateral walls of the lower rail 10 and the outside surfaces of folded portions 11 and 12 of the upper rail 20, to support the upper rail 20 to be movable back and forth relative to the lower rail 10.

The lock mechanism 30 is disposed within the inner space defined by the lower rail 10 and upper rail 20, and constituted to lock the upper rail 20 to the lower rail 10 by tilting a lock lever 31 from the inside of the lower rail 10 and upper rail 20 toward the outside of them. As for urging means for urging the lock lever 31 in the locking direction, there is provided a torsion bar 40, which is explained later.

The lock lever 31 is formed with claws 32, which extend in one rotational direction about its body portion (rotation axis portion), and an arm 33, which extends in the other rotational direction. The opposite ends of the body portion of the lock lever 31 are held by a pair of brackets 36 and 37 through a pair of balls 34 and 35, to be rotatable about its body portion. That is, the brackets 36 and 37 are fixed to the inner side of the upper rail 20 by a pair of pins 38 and 39, respectively, as shown in FIG. 1. As a result, a pressing portion 51 of the operation lever 50 can be in contact with the arm 33 of the lock lever 31, and the lock lever 31 is supported to be tilted such that the claws 32 can be fitted into the rectangular engaging holes 11a and 21a of the lower rail 10 and upper rail 20, from the inner space toward the outside of the rails.

The torsion bar 40 has a bar-like portion 44 extending in the longitudinal direction of the upper rail 20, a contact portion 43 formed integrally with its one end to contact the arm 33 of the lock lever 31, a first mounting portion 41 formed adjacent to the contact portion 43, and a second mounting portion 42 formed at the other end of the bar-like portion 44. As shown in FIGS. 2 and 3, the first mounting portion 41 of the torsion bar 40 has a bent portion 41b, which is offset to the axis of the bar-like portion 44. Accordingly, when the bent portion 41b is engaged with the protruding portion 21e, so that the first mounting portion 41 is engaged with the first mounting hole 21b to be supported on the upper rail 20, the supporting point of the torsion bar 40 is provided. On the other hand, the second mounting portion 42 of the torsion bar 40 has engaging portions 42a and 42b extending in a direction perpendicular to the axis of the bar-like portion 44, whose external width is set to be larger than the inner width between the side walls 21 and 22 of the upper rail 20. Therefore, the engaging portions 42a and 42b at the opposite ends of the second mounting portion 42 in the lateral direction thereof are engaged with the second engaging holes 21c and 22c, respectively, as shown in FIG. 2, to provide the fixed portion of the torsion bar 40. On the contrary, the contact portion 43 is bent to provide a predetermined angle relative to the axis of the bar-like portion 44, and arranged such that the tip end of the contact portion 43 contacts the arm 33 of the lock lever 31, in such a state that the bar-like portion 44 is being supported by the upper rail 20.

As described above, when the first mounting portion 41 of the torsion bar 40 is supported by the upper rail 20, the first mounting portion 41 is served as the rotation center of the contact portion 43, and the second mounting portion 42 is fixed to the upper rail 20, and served as the fixed portion of the torsion bar 40. Consequently, when the contact portion 43 of the torsion bar 40 is placed to contact the arm 33 of the lock lever 31, the lock lever 31 is urged by its torsional force to be locked. As for the operation lever 50, it is provided for tilting the lock lever 31, and provided with a pressing portion 51 for pressing the arm 33 of the lock lever 31 from its upper side, a lever 52 for supporting it at its one end, and an operating portion 53 which is connected to the other end of the lever 52 to be tilted about the connected portion, and which is arranged to extend in the lateral direction of the vehicle in front of the upper rail 20.

According to the seat sliding device of the present embodiment as constituted above, when the operation lever 50 is in its inoperative state, the lock lever 31 is urged by the torsional force of the torsion bar 40 in its locking direction, the claws 32 have been fitted into the engaging holes 11a and 21a, from the inner space defined by the lower rail 10 and upper rail 20 toward the outside of the rails, to be placed at the locking position. Consequently, the upper rail 20 is held not to be moved relative to the lower rail 10.

When the operating portion 53 of the operation lever 50 is lifted up, the lock lever 31 is tilted against the torsional force of the torsion bar 40, so that the state of the claws 32 being fitted into the engaging holes 11a and 21a of the lower rail 10 and upper rail 20 is released. As a result, the locking state made by the lock mechanism 30 is released, to make the upper rail 20 movable relative to the lower rail 10.

As described above, as it is so constituted that the lock lever 31 is urged by the torsional force of the torsion bar 40 in its locking direction, the lock lever 31 can be urged in its locking direction certainly and appropriately. Especially, as the urging direction of the torsion bar 40 is the same as the tilting direction of the lock lever 31, variation of operational force of the lock lever 31 tends to be linear, a good feeling in operation can be ensured. Particularly, according to the above-described embodiment, as it is so arranged that the direction of the torsional force caused by the torsion bar 40 against the lock lever 31 and the lock-releasing direction of the operational force applied by the operation lever 50 against the lock lever 31 are opposed to each other on the approximately common axis, the load applied to the rotation axis of the lock lever 31 in its radial direction can be reduced. As a result, simplifying the structure for supporting the lock lever 31 can be achieved, and it can be constituted at a low cost. Also, as the lock mechanism 30 is disposed in the inner space defined by the upper rail 20 and lower rail 10, and the lock lever 31 can be tilted in the inner space, the dimension of the upper rail 20 can be made small, to provide a small device as a whole.

Also, according to the present embodiment, as it is so constituted that the torsion bar 40 has the bent portion 41b, which is engaged with the first mounting hole 21b of the recessed shape to be supported on the upper rail 20, in order to provide the supporting point of the torsion bar 40, simply the hole of the recessed shape is to be defined on the side wall 21 of the upper rail 20. For example, other parts as shown in FIG. 8 are not required, and it is not necessary to form a bent-up portion or engaging protrusion on the upper rail 20, so that it can be easily formed, and formed at a low cost.

Figure 8:
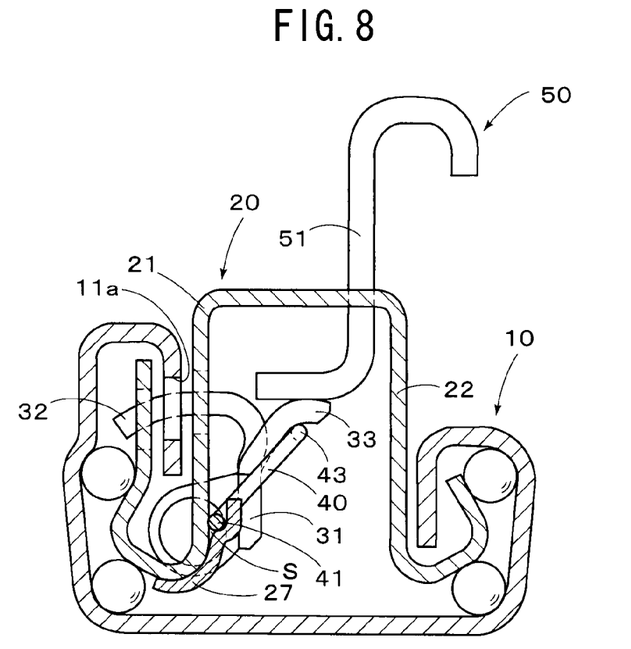
FIG. 8 is a sectional view sectioned along A-A line in FIG. 3, showing another embodiment of a lock mechanism part of a seat sliding device for a vehicle according to the present invention.

FIG. 8 shows another embodiment of the lock mechanism, where a bracket 27 is fixed to provide a clearance "S" inside of the one lateral side wall 21 of the upper rail 20, and it is so constituted that the first mounting portion 41 of the torsion bar 40 is received in the clearance "S" to support the upper rail 20. In other words, the clearance "S" corresponds to the aforementioned first mounting hole 21b. Although the bracket 27 is required in this case, a part of the bar-like portion 44 of the torsion bar 40 can be used as the first mounting portion 41, as it is. Also, according to the present embodiment, the designing feasibility can be increased, depending upon the designing or assembling conditions.

Figure 9:
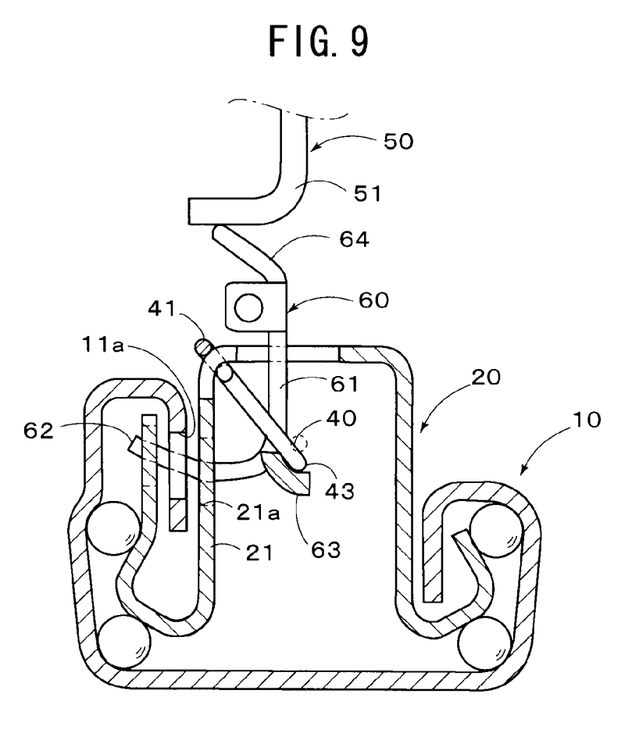
FIG. 9 is a sectional view of a lock mechanism part of a seat sliding device for a vehicle according to another embodiment of the present invention.

Furthermore, as another embodiment, it may be so constituted that the locking direction in the aforementioned lock mechanism 30 is set to be opposite, by changing the supporting condition of the torsion bar 40. That is, as shown in FIG. 9, according to a lock mechanism 60 of the present embodiment, a body portion (rotation axis portion) of a lock lever 61 is arrange to be positioned upward in the upper rail 20, claws 62 are formed at a lower portion of the lock lever 61 to extend from the inner space to the outside of the rails, and an arm 63 is formed to extend in a direction opposite to it. The contact portion 43 of the torsion bar 40 is supported on the arm 63.

Furthermore, a lever 64 is formed to extend upward from the body portion (rotation axis portion) of the lock lever 61, and arranged to be in contact with the pressing portion 51 of the operation lever 50 at its tip end. The body portion (rotation axis portion) of the lock lever 61 is positioned outside of the upper rail 20, and mounted to be rotatable on a bracket (not shown) provided at an upper portion of the upper rail 20. Therefore, when the first mounting portion 41 is mounted on the upper rail 20, the first mounting portion 41 is served as the rotation center of the contact portion 43, whereas the second mounting portion (same as 42 in FIGS. 2 and 3) is fixed to the upper rail 20.

Consequently, when the contact portion 43 of the torsion bar 40 is placed to contact the arm 63 of the lock lever 61, the lock lever 61 is urged by its torsional force in its locking position. And, when the lever 64 is pressed downward by the pressing portion 51 of the operation lever 50, the lock lever 61 is tilted to release the claws 62 from the state fitted into the engaging holes 11a and 21a of the lower rail 10 and upper rail 20. As a result, the locking state made by the lock mechanism 60 is released, so that the upper rail 20 will be movable relative to the lower rail 10. As other structures are the same as those disclosed in FIGS. 1-7, explanation of them is omitted herein.

According to the present embodiment, with the supporting condition of the torsion bar 40 being changed, the lock lever 61 is to be formed in a slightly complex shape as shown in FIG. 9. However, the locking direction of the lock mechanism 60 can be set to be opposite to that in the aforementioned embodiment. Although it is impossible to constitute this embodiment according to the aforementioned prior arts, the above-described lock mechanism 60 can be constituted, depending upon the designing or assembling conditions, according to the present invention. Thus, with the supporting condition of the torsion bar being changed, the locking direction of the lock mechanism can be set to be opposite, the designing feasibility can be increased, comparing with the prior devices.

Figure 10:
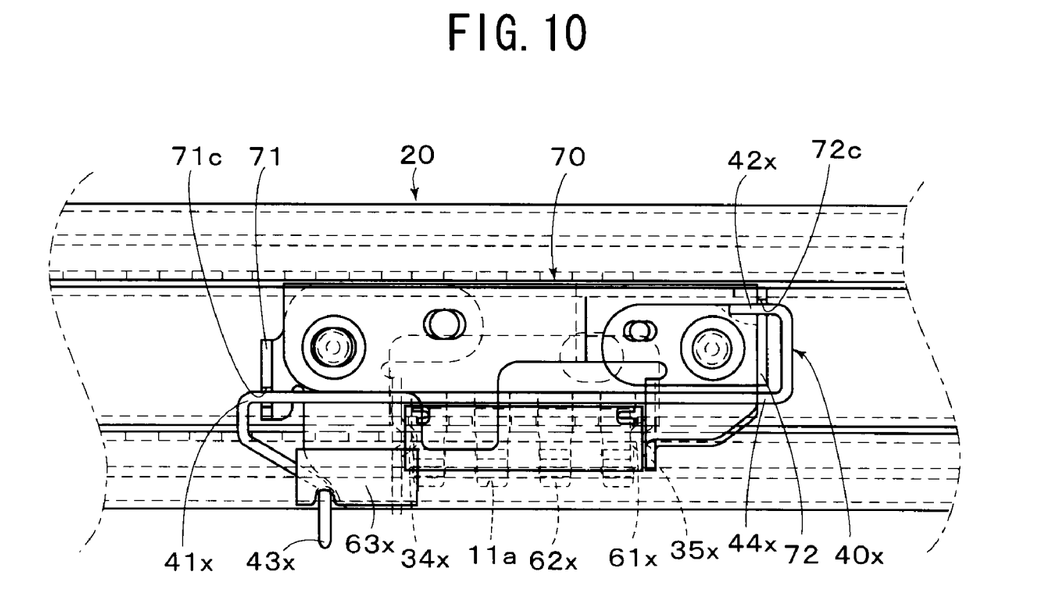
FIG. 10 is a plan view of a lock mechanism part of a seat sliding device for a vehicle according to a further embodiment of the present invention.
Figure 11:
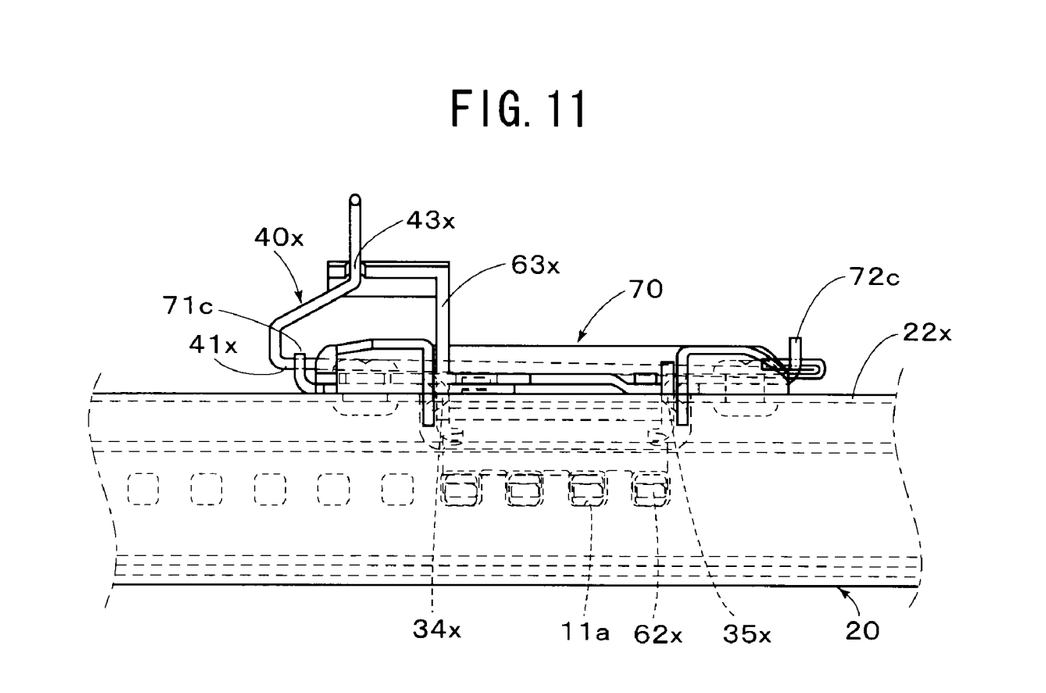
FIG. 11 is a side view of a lock mechanism part of a seat sliding device for a vehicle according to a further embodiment of the present invention.
Figure 12:
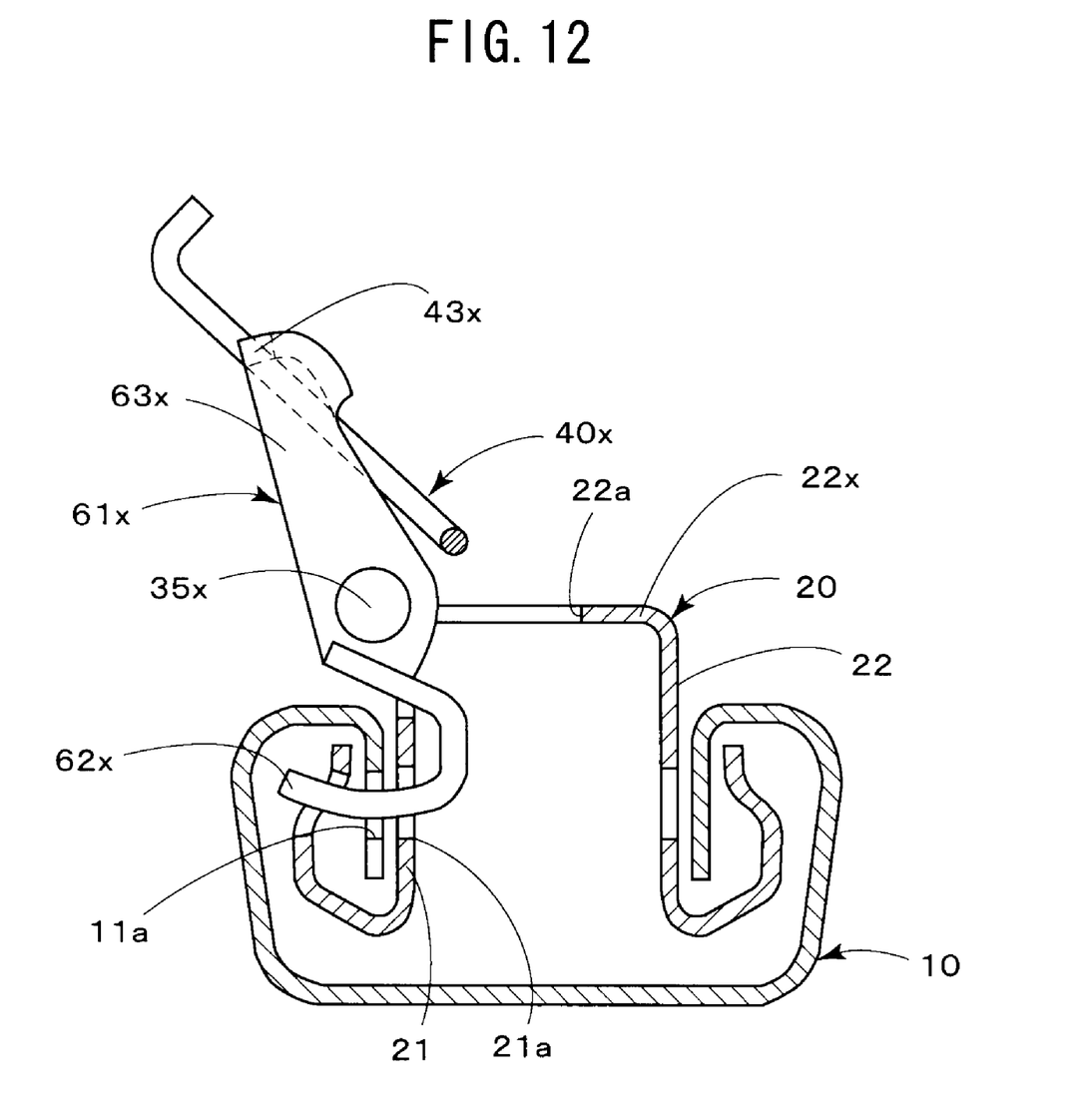
FIG. 12 is a sectional view of a lock mechanism part of a seat sliding device for a vehicle according to a further embodiment of the present invention.

FIGS. 10-12 show a further embodiment, where the lower rail 10 has the same structure as that in the aforementioned embodiment. The upper rail 20 is formed with an opening 22a at a corner portion between its upper wall 22x and one side wall 21, and a bracket 70 is fixed to the upper wall 22x. This bracket 70 has a first flange wall 71 and a second flange wall 72 formed upward, on which a first cutout 71c and a second cutout 72c are defined, respectively. And, a lock lever 61x has a body portion with its opposite sides being supported to be rotatable on the bracket 70 through a pair of bearings 34x and 35x, and claws 62x are formed to extend from the aforementioned inner space to the outside of the rails, and an arm 63x is arranged to extend from the inner space to the outside of the rails, thorough the opening 22a.

As shown in FIGS. 10 and 11, a torsion bar 40x used in this embodiment is formed to be bent, with its first mounting portion 41x being engaged with the first cutout 71c, and with its second mounting portion 42x being engaged with the second cutout 72c, and arranged to be in contact with the arm 63x at its contact portion 43x. Therefore, the first mounting portion 41x of the torsion bar 40x is served as the rotation center of the contact portion 43x, whereas the second mounting portion 42x is held in such a state as being engaged with the bracket 70.

Consequently, when the contact portion 43x of the torsion bar 40x is placed to contact the arm 63x of the lock lever 61x, the lock lever 61x is urged by its torsional force to be locked. And, when the lock lever 61x is tilted, the claws 62x are released from the state fitted into the engaging holes 11a and 21a of the lower rail 10 and upper rail 20, in the same manner as described before. As other structures are the same as those disclosed in FIGS. 1-9, explanation of them is omitted herein. Thus, with the shape and supporting condition of the torsion bar 70 being changed, the designing feasibility will be increased more.

The invention claimed is:

1. A seat sliding device for a vehicle comprising:
    a lower rail fixed to a floor of said vehicle;
    an upper rail supported on a seat of said vehicle, said upper rail being mounted on said lower rail to be longitudinally movable relative thereto, and to define an inner space together with said lower rail;
    a lock lever disposed in said inner space defined by said upper rail and said lower rail, said lock lever being tilted from said inner space toward the outside of said rails to lock said upper rail relative to said lower rail;
    a torsion bar having a bar-like portion extended longitudinally along said upper rail, a contact portion formed integrally therewith at one end thereof to contact said lock lever, a first mounting portion formed adjacent to said contact portion and supported on said upper rail to provide a rotation center of said contact portion, and a second mounting portion formed at the other end of said bar-like portion and fixed to said upper rail to provide a fixed portion of said torsion bar; and
    operation means for operating said lock lever in a releasing direction thereof;
    wherein said upper rail has a pair of lateral side walls, and a first mounting hole defined in one of said side walls, and wherein said first mounting portion of said torsion bar has a bent portion being offset to an axis of said bar-like portion to be engaged with said first mounting hole, to support said first mounting portion on said upper rail.

2. A seat sliding device as set forth in claim 1, wherein a bracket is fixed to said upper rail to define a clearance inside of one of said pair of side walls, and wherein said second mounting portion of said torsion bar is received in said clearance, to be supported by said upper rail.

3. A seat sliding device as set forth in claim 1, wherein a pair of second mounting holes is defined in said pair of side walls respectively, to be opposed to each other, and said second mounting portion has a larger width than an inner width of said pair of side walls of said upper rail, and wherein laterally opposite ends of said second mounting portion are engaged with said pair of second mounting holes, respectively.

4. A seat sliding device for a vehicle comprising:
    a lower rail fixed to a floor of said vehicle;
    an upper rail supported on a seat of said vehicle, said upper rail being mounted on said lower rail to be longitudinally movable relative thereto, and to define an inner space together with said lower rail
    a lock lever disposed in said inner space defined by said upper rail and said lower rail, said lock lever being tilted from said inner space toward the outside of said rails to lock said upper rail relative to said lower rail
    a torsion bar having a bar-like portion extended longitudinally along said upper rail, a contact portion formed integrally therewith at one end thereof to contact said lock lever, a first mounting portion formed adjacent to said contact portion and supported on said upper rail to provide a rotation center of said contact portion, and a second mounting portion formed at the other end of said bar-like portion and fixed to said upper rail to provide a fixed portion of said torsion bar; and
    operation means for operating said lock lever in a releasing direction thereof;
    wherein said upper rail has a pair of lateral side walls, an upper wall connecting said pair of side walls, and an opening defined at a corner portion between said upper wall and one of said pair of side walls, and wherein said operation means is disposed for tilting said lock lever in a releasing direction thereof through said opening.

5. A seat sliding device as set forth in claim 4, wherein said contact portion is disposed relative to said operation means and said lock lever, such that a direction of torsional force caused by said torsion bar against said lock lever, and a lock-releasing direction of operational force applied by said operation means are opposed to each other on an approximately common axis.

6. A seat sliding device for a vehicle comprising:
    a lower rail fixed to a floor of said vehicle;
    an upper rail supported on a seat of said vehicle, said upper rail being mounted on said lower rail to be longitudinally movable relative thereto, and to define an inner space together with said lower rail;
    a lock lever disposed in said inner space defined by said upper rail and said lower rail, said lock lever being tilted from said inner space toward the outside of said rails to lock said upper rail relative to said lower rail;
    a torsion bar having a bar-like portion extended longitudinally along said upper rail, a contact portion formed integrally therewith at one end thereof to contact said lock lever, a first mounting portion formed adjacent to said contact portion and supported on said upper rail to provide a rotation center of said contact portion, and a second mounting portion formed at the other end of said bar-like portion and fixed to said upper rail to provide a fixed portion of said torsion bar; and
    operation means for operating said lock lever in a releasing direction thereof;
    wherein said upper rail has a pair of lateral side walls, an upper wall connecting said pair of side walls, and an opening defined at a corner portion between said upper wall and one of said side walls, and wherein said lock lever has an arm extended from said inner space to the outside of said rails through said opening to contact said contact portion.

7. A seat sliding device as set forth in claim 6, wherein said upper rail has a bracket fixed to said upper rail, said bracket having a first flange wall with a first cutout defined therein and a second flange wall with a second cutout defined therein, and wherein said first mounting portion of said torsion bar is engaged with said first cutout, and said second mounting portion of said torsion bar is engaged with said second cutout.

* * * * *